(12) United States Patent
Chang et al.

(10) Patent No.: US 12,146,354 B2
(45) Date of Patent: Nov. 19, 2024

(54) HINGE DEVICE

(71) Applicant: PEGATRON CORPORATION, Taipei (TW)

(72) Inventors: Chun-Fu Chang, Taipei (TW); Hui-Chen Wang, Taipei (TW); Yi-Chun Tang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 30 days.

(21) Appl. No.: 18/349,284

(22) Filed: Jul. 10, 2023

(65) Prior Publication Data

US 2024/0102328 A1     Mar. 28, 2024

(30) Foreign Application Priority Data

Sep. 27, 2022   (TW) .................................. 111136626

(51) Int. Cl.
*E05D 11/06*     (2006.01)
*E05D 11/08*     (2006.01)

(52) U.S. Cl.
CPC ............ *E05D 11/06* (2013.01); *E05D 11/087* (2013.01)

(58) Field of Classification Search
CPC ..... E05D 11/06; E05D 11/087; E05D 11/082; E05D 11/1078; E05Y 2999/00; G06F 1/1681; G06F 1/1616
See application file for complete search history.

(56) References Cited

U.S. PATENT DOCUMENTS

| | | | | |
|---|---|---|---|---|
| 7,607,202 B1 * | 10/2009 | Lee | ................. | G06F 1/1616 16/342 |
| 7,669,286 B2 * | 3/2010 | Lu | ................. | G06F 1/1681 16/337 |
| 7,676,889 B2 * | 3/2010 | Kim | ................. | H04M 1/021 16/374 |
| 7,685,679 B2 * | 3/2010 | Horng | ................. | G06F 1/1681 16/337 |
| 7,698,784 B2 * | 4/2010 | Hsu | ................. | F16M 11/10 16/337 |
| 7,870,644 B2 * | 1/2011 | Chang | ................. | H04M 1/0216 16/337 |
| 8,020,255 B2 * | 9/2011 | Shen | ................. | G06F 1/1616 16/337 |
| 8,205,303 B2 * | 6/2012 | Chang | ................. | G06F 1/1681 16/374 |
| 8,250,708 B2 * | 8/2012 | Lin | ................. | G06F 1/1681 16/382 |

(Continued)

FOREIGN PATENT DOCUMENTS

| | | |
|---|---|---|
| TW | I368474 B | 7/2012 |
| TW | M435808 U | 8/2012 |
| TW | I468096 B | 1/2015 |

*Primary Examiner* — Christine M Mills
*Assistant Examiner* — Matthew J Sullivan
(74) *Attorney, Agent, or Firm* — McClure, Qualey & Rodack, LLP (57) ABSTRACT

A hinge device includes a pivot seat, a rotating shaft, a first friction block, and a locking assembly. By being structurally provided with a sleeve, a first cam ring, a first elastic ring, a second friction block, a second cam ring, a second elastic ring, an elastic element, a locking portion, and a cover of the locking assembly, the hinge device has a locking function and a long service life.

6 Claims, 10 Drawing Sheets

(56) References Cited

U.S. PATENT DOCUMENTS

| | | | | |
|---|---|---|---|---|
| 8,914,946 B2* | 12/2014 | Hsu | G06F 1/1681 | 16/342 |
| 9,265,166 B2* | 2/2016 | Hsu | F16H 57/021 | |
| 9,388,614 B2* | 7/2016 | Hsu | E05D 3/12 | |
| 9,388,617 B2* | 7/2016 | Onda | E05D 11/082 | |
| 9,683,398 B2* | 6/2017 | Chuang | G06F 1/1681 | |
| 10,480,226 B1* | 11/2019 | Chen | E05D 3/122 | |
| 10,533,358 B2* | 1/2020 | Naganuma | E05D 11/087 | |
| 11,307,619 B2* | 4/2022 | Zhang | G06F 1/1616 | |
| 11,415,200 B2* | 8/2022 | Hsiao | G06F 1/1681 | |
| 11,675,396 B2* | 6/2023 | Yang | H04M 1/0216 | 361/679.27 |
| 12,006,749 B2* | 6/2024 | Lin | G06F 1/1681 | |
| 2006/0272127 A1* | 12/2006 | Chen | G06F 1/1616 | 16/340 |
| 2009/0049644 A1* | 2/2009 | Chern | G06F 1/1681 | 16/223 |
| 2009/0217486 A1* | 9/2009 | Itakura | G06F 1/1616 | 16/334 |
| 2009/0235489 A1* | 9/2009 | Chang | E05D 11/087 | 16/340 |
| 2009/0293229 A1* | 12/2009 | Chiang | G06F 1/1681 | 16/342 |
| 2009/0320243 A1* | 12/2009 | Wang | G06F 1/1616 | 16/303 |
| 2010/0031472 A1* | 2/2010 | Chang | G06F 1/1616 | 16/297 |
| 2010/0146733 A1* | 6/2010 | Shen | G06F 1/1681 | 16/297 |
| 2010/0223757 A1* | 9/2010 | Shen | G06F 1/1681 | 16/319 |
| 2010/0269295 A1* | 10/2010 | Shen | G06F 1/1681 | 16/344 |
| 2010/0269296 A1* | 10/2010 | Lin | G06F 1/1681 | 16/342 |
| 2010/0299875 A1* | 12/2010 | Shen | E05D 11/06 | 16/297 |
| 2011/0023271 A1* | 2/2011 | Shen | E05D 11/087 | 16/334 |
| 2011/0099757 A1* | 5/2011 | Chang | G06F 1/1681 | 16/297 |
| 2011/0099759 A1* | 5/2011 | Chang | G06F 1/1681 | 16/331 |
| 2011/0252600 A1* | 10/2011 | Chang | G06F 1/1681 | 16/386 |
| 2011/0283480 A1* | 11/2011 | Chang | G06F 1/1681 | 411/533 |
| 2014/0304947 A1* | 10/2014 | Wang | G06F 1/1616 | 16/325 |

* cited by examiner

HINGE DEVICE

CROSS-REFERENCE TO RELATED APPLICATION

This application claims the priority benefit of Taiwan application serial no. 111136626, filed on Sep. 27, 2022. The entirety of the above-mentioned patent application is hereby incorporated by reference herein and made a part of this specification.

TECHNICAL FIELD

The present disclosure relates to a hinge device, and in particular, to a hinge device having a rotating shaft structure with a locking function.

BACKGROUND

A hinge device is widely used in an electronic product with a flipping function, such as a notebook computer, an audio-video playing device, and a foldable phone. A rotating shaft structure of the hinge device plays a very important role.

The existing hinge devices are distinguished into hinge devices having a rotating shaft structure with or without a locking function. The hinge device without the locking function may affect the opening and closing function of a main body and a cover of the foregoing electronic product. When moments on the main body and the cover are greater than a resisting moment of the rotating shaft structure, the main body and the cover will be opened and closed arbitrarily. Due to the structural design of double embedded cams inside the rotating shaft structure with the locking function, another resisting moment is required to be applied when a rotating shaft rotates between two rotation angles. Compared with the rotating shaft structure without the locking function, the rotating shaft structure with the locking function is more likely to be damaged after long-term use.

SUMMARY

In view of this, the present disclosure provides a hinge device. In one embodiment, the hinge device includes a pivot seat, a rotating shaft, a first friction block, and a locking assembly. The pivot seat is provided with a shaft hole. The rotating shaft penetrates through the shaft hole. Both ends of the rotating shaft are defined as a free end and a locking end. The first friction block is connected to the pivot seat. The first friction block is provided with an opening. The rotating shaft passes through the opening. The first friction block is located at the free end of the rotating shaft. The locking assembly includes a sleeve, a first cam ring, a first elastic ring, a second friction block, a second cam ring, a second elastic ring, an elastic element, a locking portion, and a cover. One end of the sleeve is provided with a first retaining wall. The first retaining wall is provided with a first port. The other end of the sleeve has a second port. The first friction block is located in the first port. The first cam ring encircles the first friction block. An inner side wall of the first cam ring is provided with a first engaging structure. The first elastic ring is located between the first retaining wall and the first cam ring. The first elastic ring encircles the first friction block. The first elastic ring is pushed by the first retaining wall to have a first elastic force for normally moving the first cam ring toward the locking end. The second friction block is provided with a hole. The rotating shaft passes through the hole. The second friction block is adjacent to the first friction block. The second cam ring encircles the second friction block. The second cam ring has an inner wall surface. The inner wall surface faces the inner side wall. The inner wall surface is provided with a second engaging structure. The second engaging structure selectively engages with or disengages from the first engaging structure. The second elastic ring encircles the second friction block. The elastic element is adjacent to the second friction block. The locking portion is arranged at the locking end and adjacent to the elastic element. The locking portion abuts against the elastic element so that the elastic element normally pushes the second friction block to contact the second friction block. The cover covers the second port. The cover is provided with a second retaining wall abutting against the second elastic ring, so that the second elastic ring has a second elastic force for normally moving the second cam toward the first cam ring. The rotating shaft is forced to rotate so that a friction moment is generated between the first friction block and the second friction block, and the second engaging structure engages with or disengages from the first engaging structure.

According to some embodiments, the pivot seat includes a base and a vertical plate. The vertical plate is connected to the base. The vertical plate is provided with the shaft hole.

According to some embodiments, the first engaging structure includes a first wedge groove and a first convex portion, and the second engaging structure includes a second wedge groove and a second convex portion. When the second engaging structure engages with the first engaging structure, the first convex portion is located in the second wedge groove, and the second convex portion is located in the first wedge groove. When the second engaging structure disengages from the first engaging structure, the first convex portion moves out of the second wedge groove, the second convex portion moves out of the first wedge groove, and the first convex portion abuts against the second convex portion.

According to some embodiments, the elastic element is selected from a group consisting of a spring, a wave leaf spring, or a disc leaf spring.

According to some embodiments, the first elastic ring is selected from a group consisting of a spring, a wave leaf spring, or a disc leaf spring.

According to some embodiments, the second elastic ring is selected from a group consisting of a spring, a wave leaf spring, or a disc leaf spring.

According to some embodiments, the hinge device has a locking function by structurally including the pivot seat, the rotating shaft, the first friction block, and the locking assembly, and has a longer service life cycle than that of the existing hinge device with the locking function, thus alleviating the problems in the prior art.

DETAILED DESCRIPTION

Figure 1:
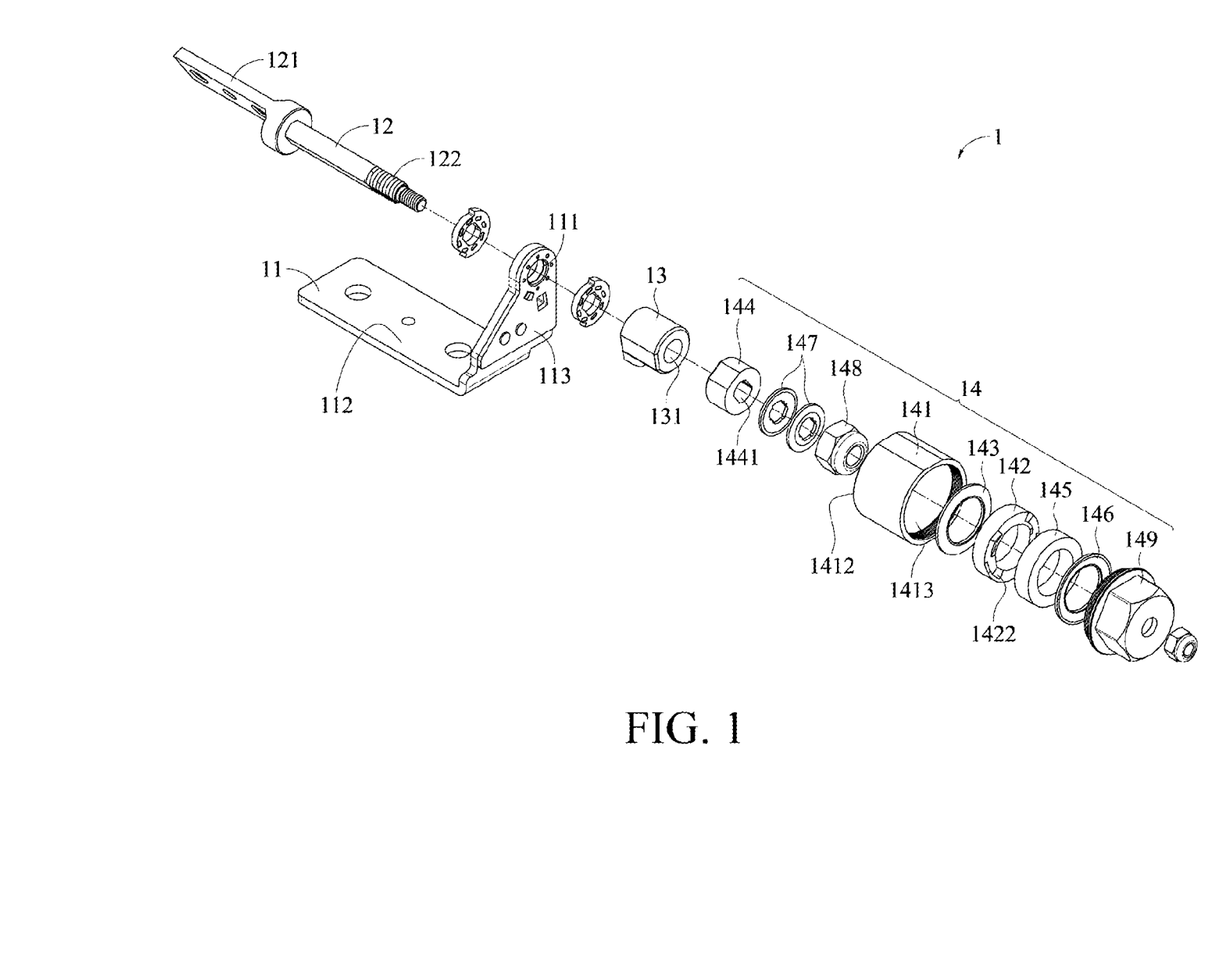
FIG. 1 shows a schematic exploded view of a hinge device according to one embodiment.
Figure 2:
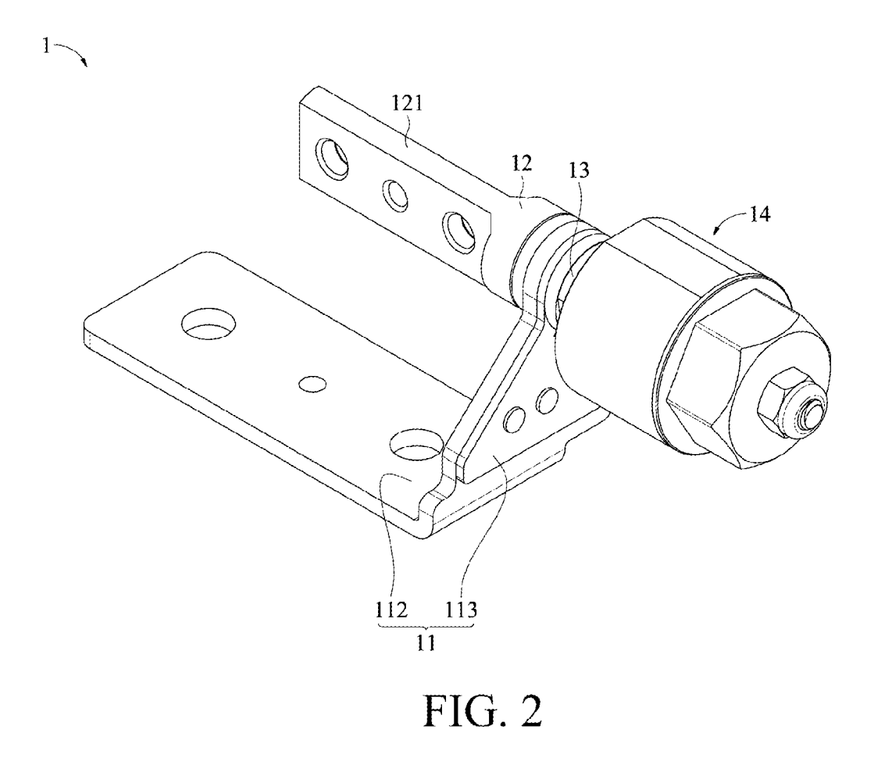
FIG. 2 shows a schematic assembled view according to the embodiment in FIG. 1.
Figure 3:
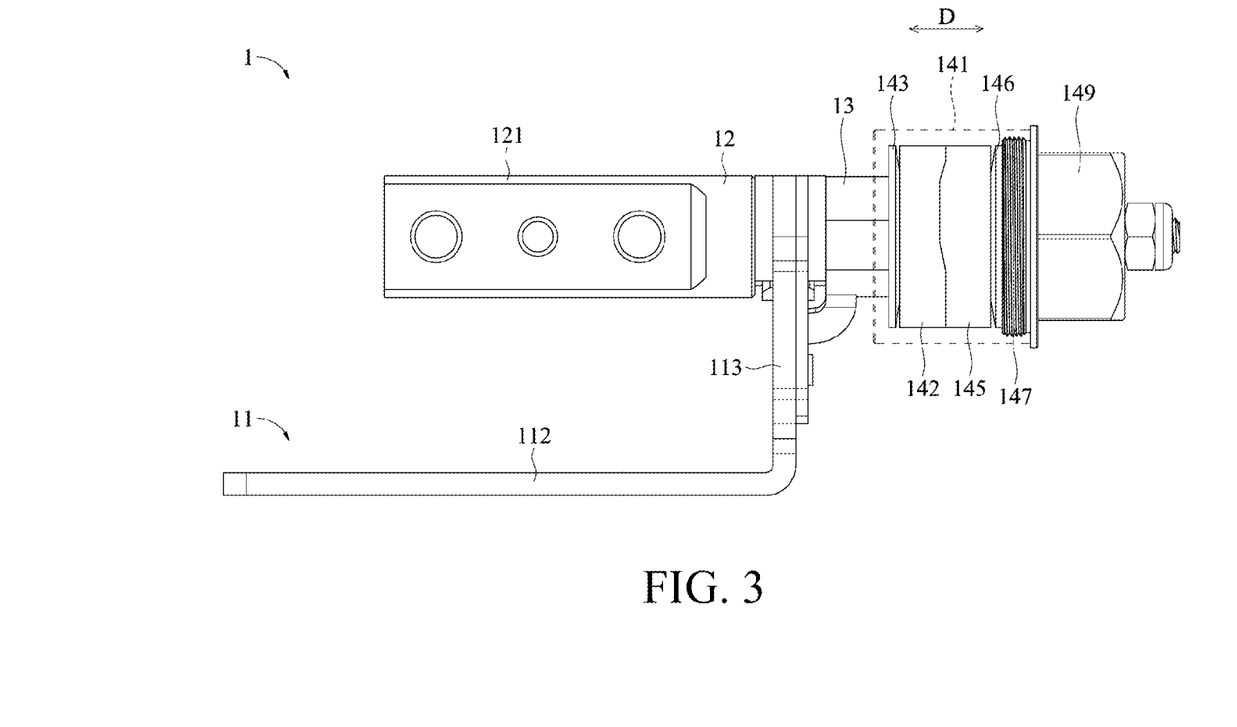
FIG. 3 shows a schematic assembled view according to the embodiment in FIG. 1.
Figure 4:
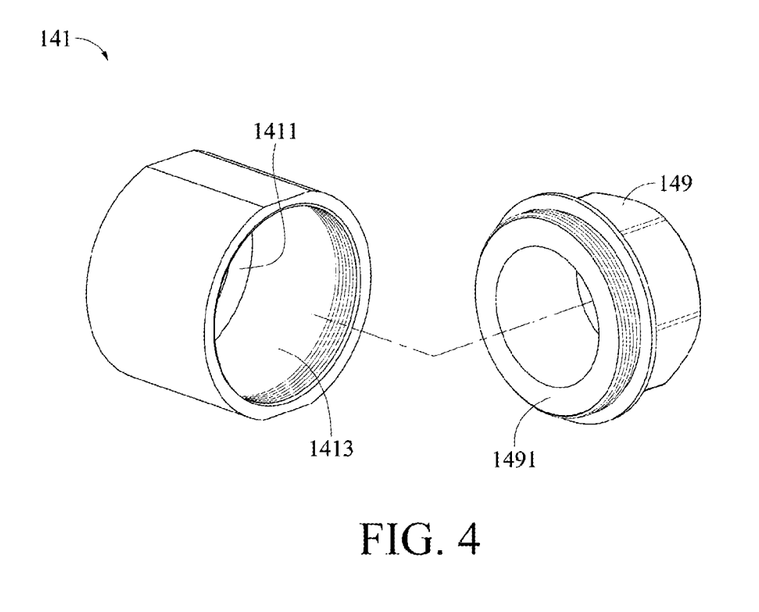
FIG. 4 shows a schematic diagram of a sleeve and a cover according to one embodiment.
Figure 5:
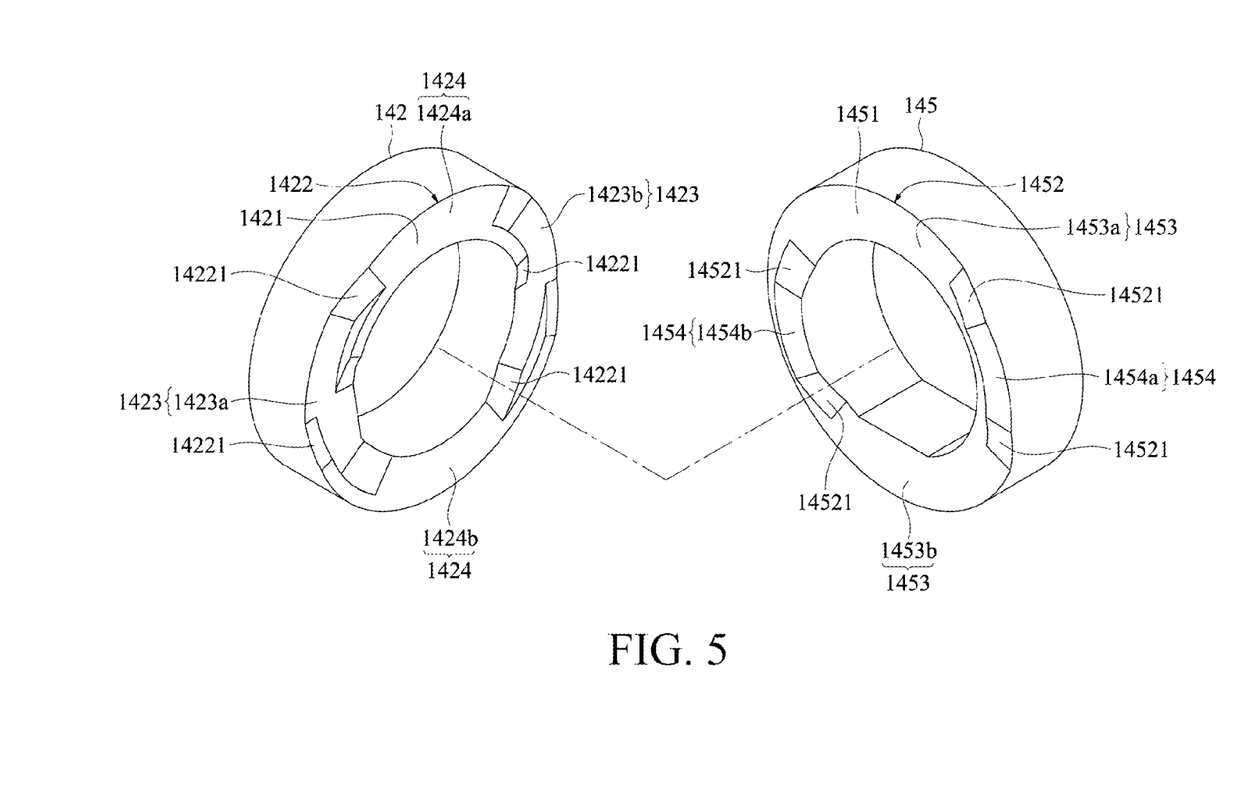
FIG. 5 shows a schematic diagram of a first cam ring and a second cam ring according to one embodiment.

Reference is made to FIG. 1 to FIG. 5. FIG. 1 shows a schematic exploded view of a hinge device 1 according to one embodiment. FIG. 2 shows a schematic assembled view according to the embodiment in FIG. 1. FIG. 3 shows a schematic assembled view according to the embodiment in FIG. 1 from a different perspective from FIG. 2. FIG. 4 shows a schematic diagram of a sleeve 141 and a cover 149 according to one embodiment. FIG. 5 shows a schematic diagram of a first cam ring 142 and a second cam ring 145 according to one embodiment. According to the embodiment shown in FIG. 1, the hinge device 1 includes a pivot seat 11, a rotating shaft 12, a first friction block 13, and a locking assembly 14.

The pivot seat 11 is provided with a shaft hole 111. The rotating shaft 12 penetrates through the shaft hole 111. The rotating shaft 12 has a free end 121 and a locking end 122. The first friction block 13 is connected to the pivot seat 11. The first friction block 13 is provided with an opening 131. The rotating shaft 12 passes through the opening 131. The first friction block 13 is located at the free end 121 of the rotating shaft 12. The locking assembly 14 includes a sleeve 141, a first cam ring 142, a first elastic ring 143, a second friction block 144, a second cam ring 145, a second elastic ring 146, an elastic element 147, a locking portion 148, and a cover 149. One end of the sleeve 141 is provided with a first retaining wall 1411 (see FIG. 4). The first retaining wall 1411 is provided with a first port 1412. The other end of the sleeve 141 has a second port 1413. The first friction block 13 is located in the first port 1412. The first cam ring 142 encircles the first friction block 13. An inner side wall 1421 of the first cam ring 142 is provided with a first engaging structure 1422 (see FIG. 5). The first elastic ring 143 is located between the first retaining wall 1411 and the first cam ring 142. The first elastic ring 143 encircles the first friction block 13. The first elastic ring 143 is pushed by the first retaining wall 1411 to have a first elastic force for normally moving the first cam ring 142 toward the locking end 122. The second friction block 144 is provided with a hole 1441. The rotating shaft 12 passes through the hole 1441. The second friction block 144 is adjacent to the first friction block 13. The second cam ring 145 encircles the second friction block 144. The second cam ring 145 has an inner wall surface 1451. The inner wall surface 1451 faces the inner side wall 1421. The inner wall surface 1451 is provided with a second engaging structure 1452 (see FIG. 5). The second engaging structure 1452 selectively engages with or disengages from the first engaging structure 1422. The second elastic ring 146 encircles the second friction block 144. The elastic element 147 is adjacent to the second friction block 144. The locking portion 148 is arranged at the locking end 122 and adjacent to the elastic element 147. The locking portion 148 abuts against the elastic element 147 so that the elastic element 147 normally pushes the second friction block 144 to contact the second friction block 144. The cover 149 covers the second port 1413. The cover 149 has a second retaining wall 1491 (see FIG. 4) abutting against the second elastic ring 146, so that the second elastic ring 146 has a second elastic force for normally moving the second cam toward the first cam ring 142. The rotating shaft 12 is forced to rotate so that a friction moment is generated between the first friction block 13 and the second friction block 144, and the second engaging structure 1452 engages with or disengages from the first engaging structure 1422.

The foregoing engaging may be, but is not limited to, clamping, embedding, or butting, etc. The foregoing disengaging may be, but is not limited to, release of the above clamping, embedding, or butting by mutual rotation of the first engaging structure 1422 or the second engaging structure 1452, or may be separation of the first engaging structure 1422 and the second engaging structure 1452, which will be described in detail later.

According to the embodiment shown in FIG. 1 and FIG. 2, the pivot seat 11 includes a base 112 and a vertical plate 113. The vertical plate 113 is connected to the base 112. The vertical plate 113 is provided with the shaft hole 111. The first friction block 13 is located on the vertical plate 113. According to the embodiment shown in FIG. 3, the first cam ring 142 may rotate synchronously with the first friction block 13 and may move relative to the first friction block 13 along an axial direction D of the rotating shaft 12. The second cam ring 145 may rotate synchronously with the second friction block 144 and may move relative to the second friction block 144 along the axial direction D. When the rotating shaft 12 rotates, the second friction block 144 and the second cam ring 145 are driven to rotate. At this moment, the second friction block 144 rotates and generates friction relative to the first friction block 13. A friction moment is generated between the first friction block 13 and the second friction block 144. The second cam ring 145 rotates relative to the first cam ring 142. The second engaging structure 1452 rubs against the first engaging structure 1422, so that the above engaging or disengaging occurs, and a resisting moment is generated between the first cam ring 142 and the second cam ring 145. Therefore, a moment required by a user to rotate the rotating shaft 12 must be greater than the foregoing friction moment plus resisting moment.

Figure 6:
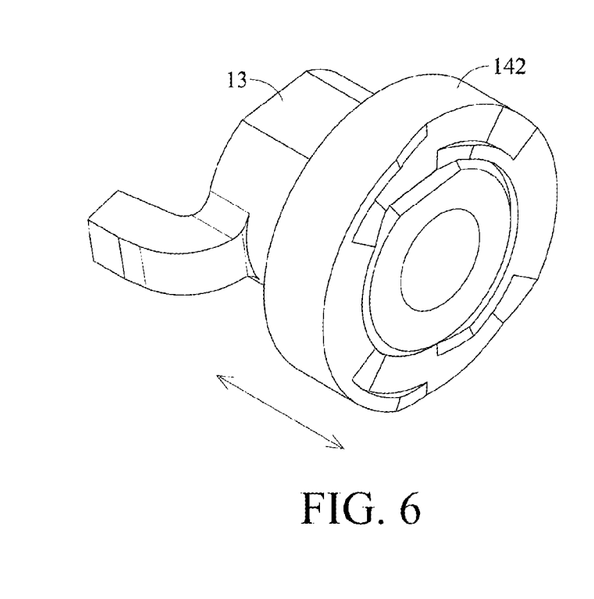
FIG. 6 shows a diagram of a first friction block and a first cam ring according to one embodiment.
Figure 7:
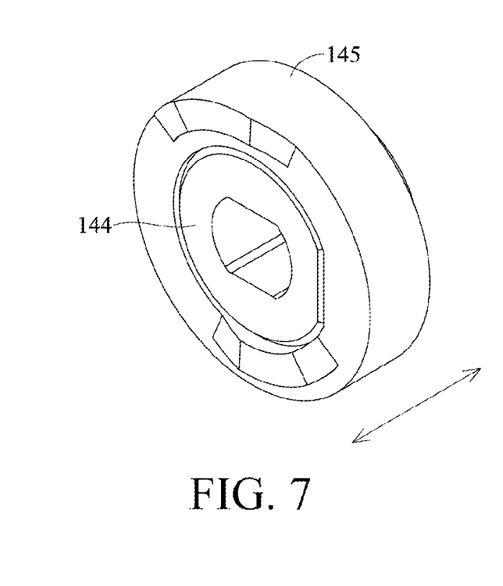
FIG. 7 shows a diagram of a second friction block and a second cam ring according to one embodiment.

FIG. 6 shows a diagram of a first friction block and a first cam ring according to one embodiment. FIG. 7 shows a diagram of a second friction block and a second cam ring according to one embodiment. Herein, FIG. 6 and FIG. 7 show only a relative relationship between the elements and omit parts of the elements and other elements. As shown in FIG. 6, the first cam ring 142 is sleeved on a portion of the first friction block 13, and the first friction block 13 drives the first cam ring 142 to rotate synchronously along the rotating shaft 12 during rotation. Therefore, there is no radial relative rotation therebetween. The sleeving position of the first cam ring 142 may move relative to the first friction block 13 along the axial direction D of the rotating shaft 12. Therefore, the first friction block 13 and the first cam ring 142 move relatively without relative rotation. Similarly, the second cam ring 145 is likewise sleeved on a portion of the second friction block 144 and moves relatively without relative rotation.

Figure 8A:
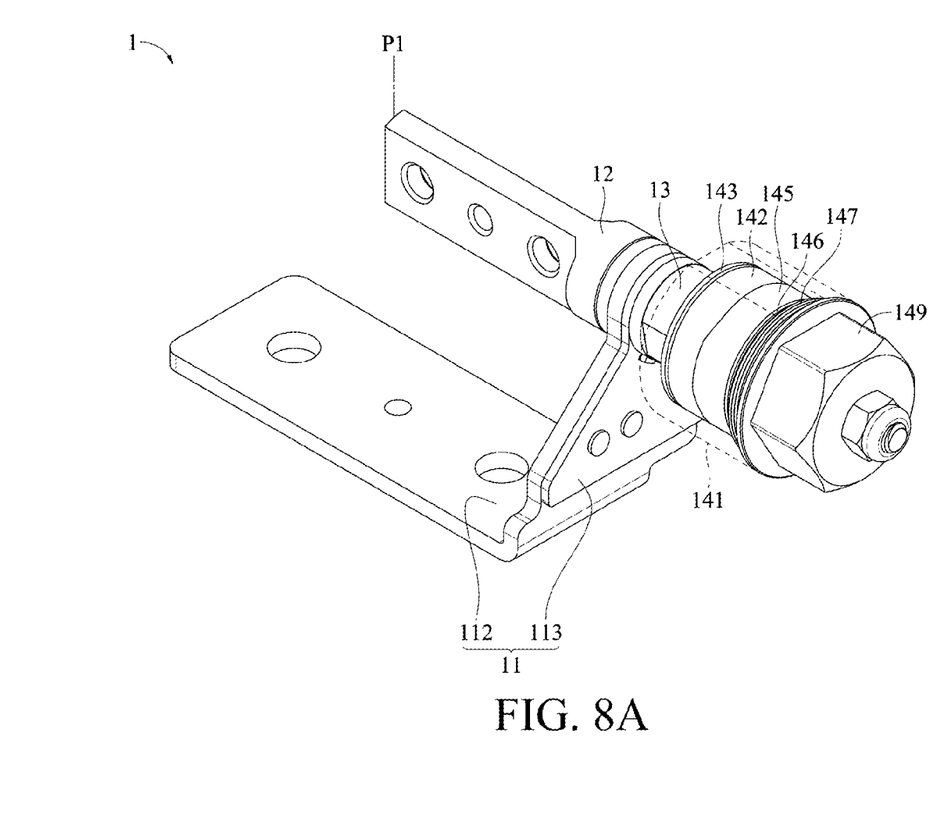
FIG. 8A to FIG. 8C show a schematic usage view of a hinge device according to one embodiment respectively.
Figure 8B:
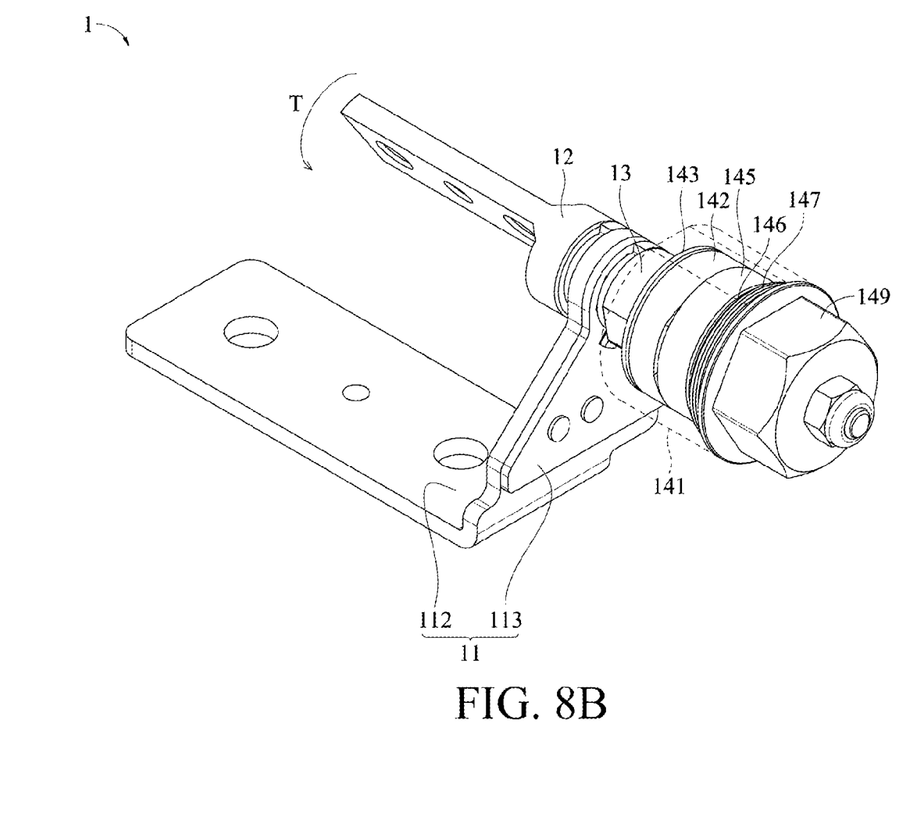
Figure 8C:
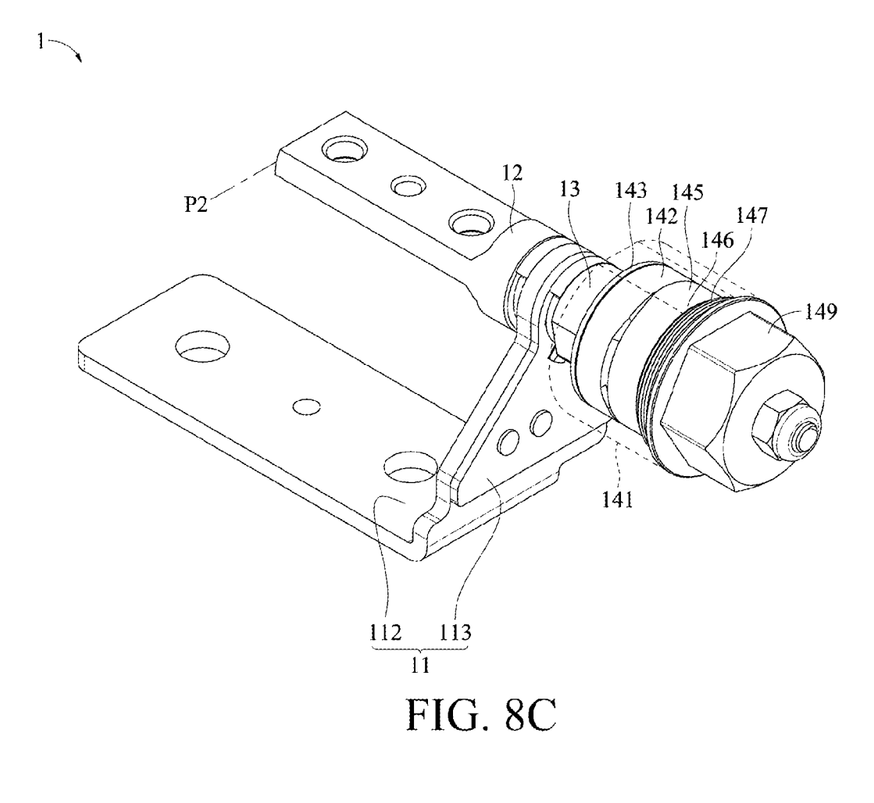

Reference is made to FIG. 8A to FIG. 8C as well as FIG. 5. FIG. 8A to FIG. 8C show a schematic usage state view of a hinge device 1 according to one embodiment respectively. According to the embodiment shown in FIG. 5, the first engaging structure 1422 includes a first wedge groove 1423 and a first convex portion 1424, and the second engaging structure 1452 includes a second wedge groove 1453 and a second convex portion 1454. In this embodiment, there are two first wedge grooves 1423, which are defined as a first wedge groove 1423a and a first wedge groove 1423b respectively. There are two first convex portions 1424, which are defined as a first convex portion 1424a and a first convex portion 1424b. The first wedge grooves 1423 and the first convex portions 1424 are staggered. There are two second wedge grooves 1453, which are defined as a second wedge groove 1453a and a second wedge groove 1453b respectively. There are two second convex portions 1454, which are defined as a second convex portion 1454a and a second convex portion 1454b. The second wedge grooves 1453 and the second convex portions 1454 are staggered. The shapes of the first wedge grooves 1423 are matched to the second convex portions 1454, and the shapes of the second wedge grooves 1453 are matched to the first convex portions 1424. The matching is such that any first convex portion 1424 may move into any second wedge groove 1453 and any second convex portion 1454 may move into any first wedge groove 1423. The present disclosure does not require that the first convex portion 1424 and the second wedge groove 1453, and the second convex portion 1454 and the first wedge groove 1423 should be structurally consistent. As shown in FIG. 8A, the rotating shaft 12 of the hinge device 1 is at an initial position P1. When the first engaging structure 1422 engages with the second engaging structure 1452, the first convex portion 1424a is located in the second wedge groove 1453a, the first convex portion 1424b is located in the second wedge groove 1453b, the second convex portion 1454a is located in the first wedge groove 1423a, and the second convex portion 1454b is located in the first wedge groove 1423b (see FIG. 5). When the rotating shaft 12 rotates in a rotation direction T, the second friction block 144 and the second cam ring 145 are driven to rotate, and the second cam ring 145 rotates relative to the first cam ring 142. As shown in FIG. 8B, the two first convex portions 1424 move out of the corresponding second wedge grooves 1453, the two second convex portions 1454 move out of the corresponding first wedge grooves 1423, and the two first convex portions 1424 correspondingly abut against the second convex portions 1454. At this moment, the first engaging structure 1422 disengages from the second engaging structure 1452. According to the embodiment shown in FIG. 5, the first engaging structure 1422 further includes a guide slope 14221, and the second engaging structure 1452 further includes a guide slope 14521. Therefore, when the rotating shaft 12 rotates, the first convex portion 1424 may smoothly move out of the second wedge groove 1453 (i.e. move toward the outside of the second wedge groove 1453), and the second convex portion 1454 may smoothly move out of the first wedge groove 1423 (i.e. move toward the outside of the first wedge groove 1423). When the rotating shaft 12 rotates by 90 degrees, the rotating shaft 12 is located at a locking position P2. The two first convex portions 1424 move to the corresponding second wedge grooves 1453 respectively, and the two second convex portions 1454 move to the corresponding first wedge grooves 1423 respectively, thus completing the locking function of the rotating shaft 12, as shown in FIG. 8C. The present disclosure is not limited to the numbers, positions, and shapes of the first convex portion 1424, the second convex portion 1454, the first wedge groove 1423, and the second wedge groove 1453. The structures determine the rotation angle of the rotating shaft 12, and further determine the number of engagements and disengagements between the first engaging structure 1422 and the second engaging structure 1452, which may be designed by a manufacturer according to the requirements of customers. According to the embodiment shown in FIG. 8A, the hinge device 1 has a two-stage locking function. According to additional embodiments, there are more than two first convex portions 1424, second convex portions 1454, first wedge grooves 1423, and second wedge grooves 1453 respectively. That is, the hinge device has a multi-stage locking function.

According to some embodiments, the first elastic ring 143 is selected from a group consisting of a spring, a wave leaf spring, or a disc leaf spring. The present disclosure is not limited thereto. According to some embodiments, the second elastic ring 146 is selected from a group consisting of a spring, a wave leaf spring, or a disc leaf spring. The present disclosure is not limited thereto. According to some embodiments, the elastic element 147 is selected from a group consisting of a spring, a wave leaf spring, or a disc leaf spring. The present disclosure is not limited thereto.

According to some embodiments, the hinge device may be applied to a 3C product such as a notebook computer, a foldable phone, or audio-video playing equipment. The present disclosure is not limited thereto.

According to some embodiments, the hinge device has a locking function by the structural design of the pivot seat, the rotating shaft, the first friction block, and the locking assembly, and has a longer service life than that of the existing hinge device with the locking function.

What is claimed is:

1. A hinge device, comprising:
   a pivot seat provided with a shaft hole;
   a rotating shaft penetrating through the shaft hole, both ends of the rotating shaft being defined as a free end and a locking end;
   a first friction block connected to the pivot seat, the first friction block being provided with an opening, the rotating shaft passing through the opening, and the first friction block being located at the free end of the rotating shaft; and
   a locking assembly, comprising:
   a sleeve provided with a first retaining wall at one end, the first retaining wall being provided with a first port, the other end of the sleeve having a second port, and the first friction block being located in the first port;
   a first cam ring encircling the first friction block, an inner side wall of the first cam ring being provided with a first engaging structure;
   a first elastic ring located between the first retaining wall and the first cam ring, the first elastic ring encircling the first friction block, the first elastic ring being pushed by the first retaining wall to have a first elastic force for normally moving the first cam ring toward the locking end;
   a second friction block provided with a hole, the rotating shaft passing through the hole, and the second friction block being adjacent to the first friction block;
   a second cam ring encircling the second friction block, the second cam ring having an inner wall surface, the inner wall surface facing the inner side wall, the inner wall surface being provided with a second engaging structure, and the second engaging structure selectively engaging with or disengaging from the first engaging structure;
   a second elastic ring encircling the second friction block;
   an elastic element adjacent to the second friction block;
   a locking portion arranged at the locking end and adjacent to the elastic element, the locking portion abutting against the elastic element, so that the elastic element normally pushes the second friction block to contact the second friction block; and
   a cover covering the second port, the cover being provided with a second retaining wall abutting against the second elastic ring, so that the second elastic ring has a second elastic force for normally moving the second cam ring toward the first cam ring, wherein the rotating shaft is forced to rotate so that a friction moment is generated between the first friction block and the second friction block, and the second engaging structure engages with or disengages from the first engaging structure.

2. The hinge device according to claim 1, wherein the pivot seat comprises a base and a vertical plate, the vertical plate being connected to the base, and the vertical plate being provided with the shaft hole.

3. The hinge device according to claim 1, wherein the first engaging structure comprises a first wedge groove and a first convex portion, and the second engaging structure comprises a second wedge groove and a second convex portion; when the second engaging structure engages with the first engaging structure, the first convex portion is located in the second wedge groove, and the second convex portion is located in the first wedge groove; and when the second engaging structure disengages from the first engaging structure, the first convex portion moves out of the second wedge groove, the second convex portion moves out of the first wedge groove, and the first convex portion abuts against the second convex portion.

4. The hinge device according to claim 1, wherein the first elastic ring is selected from a group consisting of a spring, a wave leaf spring, or a disc leaf spring.

5. The hinge device according to claim 1, wherein the second elastic ring is selected from a group consisting of a spring, a wave leaf spring, or a disc leaf spring.

6. The hinge device according to claim 1, wherein the elastic element is selected from a group consisting of a spring, a wave leaf spring, or a disc leaf spring.

* * * * *